US008548928B1

(12) United States Patent
Ikenberry et al.

(10) Patent No.: US 8,548,928 B1
(45) Date of Patent: Oct. 1, 2013

(54) METHOD AND SYSTEM FOR PROVIDING SEARCH ASSISTANCE VIA A COMMUNICATIONS NETWORK

(75) Inventors: John P. Ikenberry, State College, PA (US); Andrew W. Hibel, Chicago, IL (US); Eric D. Blessner, State College, PA (US)

(73) Assignee: Internet Employment Linkage, Chicago, IL (US)

( * ) Notice: Subject to any disclaimer, the term of this patent is extended or adjusted under 35 U.S.C. 154(b) by 3250 days.

(21) Appl. No.: 10/118,095

(22) Filed: Apr. 8, 2002

Related U.S. Application Data

(60) Provisional application No. 60/281,938, filed on Apr. 6, 2001.

(51) Int. Cl.
*G06Q 10/00* (2012.01)
(52) U.S. Cl.
USPC .......................... 705/321; 705/7.12; 705/7.14
(58) Field of Classification Search
USPC ...................................... 705/8, 321
See application file for complete search history.

(56) References Cited

U.S. PATENT DOCUMENTS

| | | | |
|---|---|---|---|
| 5,038,284 A | 8/1991 | Kramer | |
| 5,164,897 A | 11/1992 | Clark et al. | |
| 5,197,004 A | 3/1993 | Sobotka et al. | |
| 5,301,105 A | 4/1994 | Cummings, Jr. | |
| 5,305,195 A | 4/1994 | Murphy | |
| 5,416,694 A | 5/1995 | Parrish et al. | |
| 5,426,780 A | 6/1995 | Gerull et al. | |
| 5,506,984 A | 4/1996 | Miller | |
| 5,592,375 A | 1/1997 | Salmon et al. | |
| 5,758,324 A | 5/1998 | Hartman et al. | |
| 5,832,497 A | 11/1998 | Taylor | |
| 5,978,768 A | 11/1999 | McGovern et al. | |
| 5,999,939 A | 12/1999 | de Hilster et al. | |
| 6,038,544 A | 3/2000 | Machin et al. | |
| 6,199,079 B1 | 3/2001 | Gupta et al. | |
| 6,256,620 B1 | 7/2001 | Jawahar et al. | |
| 6,272,507 B1 | 8/2001 | Pirolli et al. | |

(Continued)

OTHER PUBLICATIONS

Internet Archive Wayback Machine. Archived pages for academic-careers.com dated Mar. 1, 2001 retrieved on Jan. 3, 2007. Retrieved from the Internet <http://web.archive.org>.*

(Continued)

*Primary Examiner* — Andre Boyce
(74) *Attorney, Agent, or Firm* — Barnes & Thornburg LLP

(57) ABSTRACT

A system and method for providing search assistance over a communications network to an employer or a job seeker advertising positions at or applying to positions at higher education learning institutions. The method enables an employer to submit information about their open positions into categorized online system accessible to persons looking for employment in higher education. The categories are specially selected to reflect current market conditions in higher education. Employers utilize a specialized posting system to make their postings. Postings are viewed and polished prior to being made available to job seekers to ensure proper categorization, content, and completeness.

Job seekers may view posted positions by entering search criteria into a search engine to produce a list of jobs matching the criteria. Job seekers may also browse listed positions by clicking through a series of categories that describe an academic discipline or administrative department. The system and method also provides tools which allow the job seeker to upload resumes, curriculum vitae, cover letters, and other relevant documents and connects the job seeker to a docketing system to schedule events related to the job seeking campaign.

1 Claim, 9 Drawing Sheets

(56) References Cited

U.S. PATENT DOCUMENTS

| | | | |
|---|---|---|---|
| 6,332,125 B1 | 12/2001 | Callen et al. | |
| 6,385,620 B1* | 5/2002 | Kurzius et al. | 707/104.1 |
| 6,662,194 B1* | 12/2003 | Joao | 707/104.1 |
| 2001/0034630 A1* | 10/2001 | Mayer et al. | 705/7 |
| 2002/0026452 A1* | 2/2002 | Baumgarten et al. | 707/104.1 |
| 2002/0046074 A1* | 4/2002 | Barton | 705/8 |
| 2002/0072946 A1* | 6/2002 | Richardson | 705/8 |
| 2002/0111843 A1* | 8/2002 | Wellenstein | 705/8 |

OTHER PUBLICATIONS

Internet Archive Wayback Machine. Archived pages for academic-careers.com, dated Apr. 5, 2001 or earlier, retrieved on Jun. 10, 2007. Retrieved from the Internet <http://web.archive.org>.*

Internet Archive Wayback Machine. Archived pages for academic-careers.com, dated Dec. 4, 2000 or earlier. Retrieved on Mar. 4, 2008, from the Internet <http://web.archive.org>.*

Martin, The USA at your Fingertips, p. 89, Jun. 1993.

Chabrow, Online Employment, pp. 38-40, Jan. 1995.

APS Related Information, pp. 3-2, 3-3, 4-3, 4-4, 4-12, 4-26, 4-31, 4-32, 4-36.

Harry, Resume: Resumix Announces Internet Services, Work-Group Computing, pp. 1-3, Jun. 1995.

Kolbasuk, Help wanted? Find it Online, Information Week, pp. 1-2, Jun. 1995.

Riley, Resume Databases on the Internet, The Riley Guide, pp. 1-5, 1995.

MCI Communications Corporation, "MCI, job and resumes posting related information.".

Sullivan, Kristina B. Vendors to Push Multimedia Wares at CD ROMs Show (PC Week) Oct. 1991 p. 28.

Clyde et al, An object Oriented Implementation of an Adaptive Classification of Job Openings, IEEE, pp. 9-16, Feb. 1995.

Belanger et al, Employment Interview Information Available Online vol. 10 No. 1, Online Reviews, pp. 45-56. Feb. 1996.

Dolan et al, Top US Sources for an Online Job, Database, pp. 35-43, Nov. 1994.

higheredjobs.com, Mar. 2, 2000 and earlier.

* cited by examiner

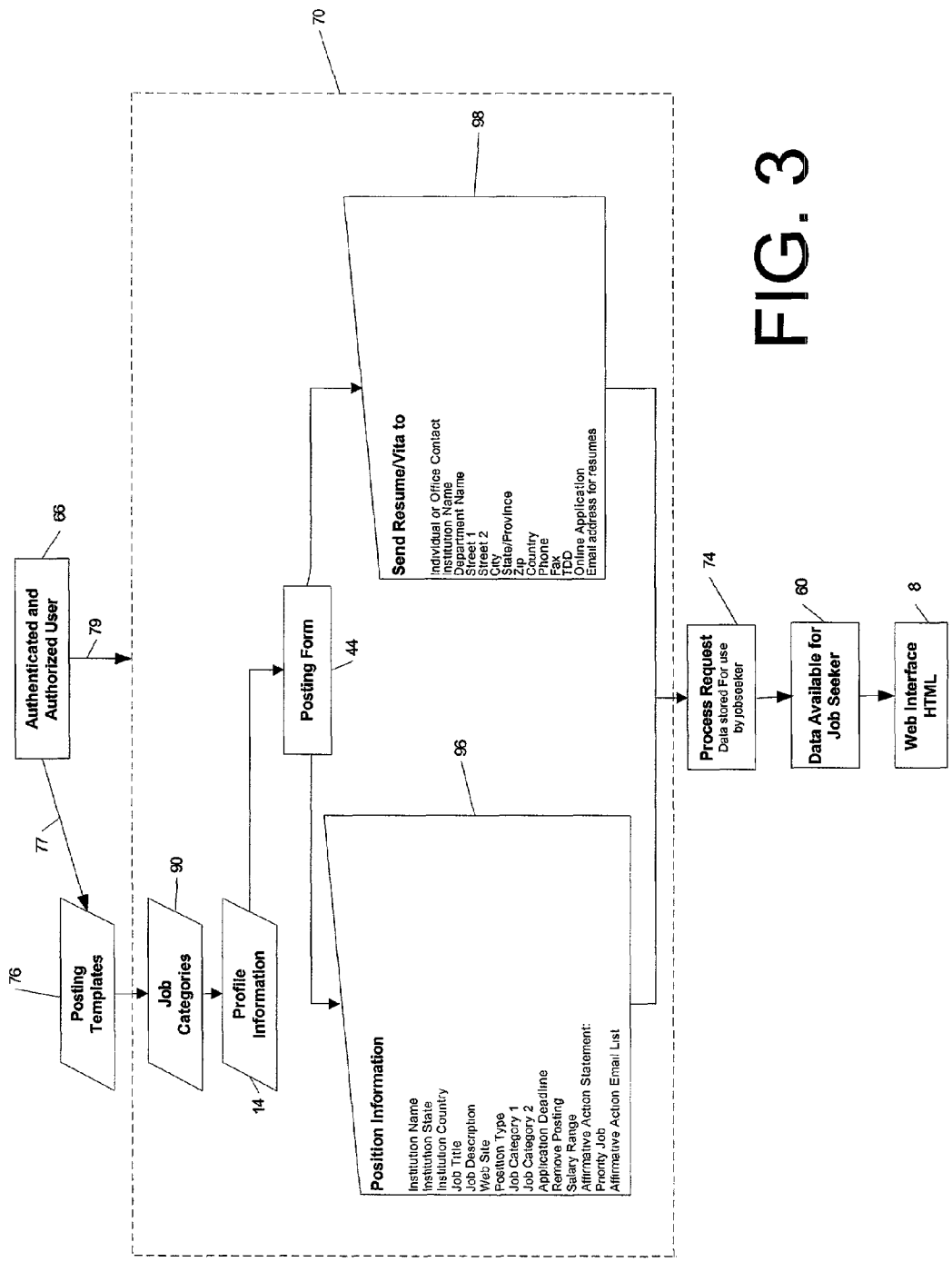

FIG. 4

ADMINISTRATIVE CATEGORIES

- Admin - Academic Advising
- Admin - Admissions and Enrollment
- Admin - Alumni Associations and Services
- Admin - Athletics
- Admin - Broadcasting, Radio, and Television
- Admin - Business and Financial Management
- Admin - Campus Safety and Police
- Admin - Career Counseling and Placement
- Admin - Child Care Services
- Admin - Computing - Management / Director
- Admin - Computing - Multimedia
- Admin - Computing - Network/System Administration
- Admin - Computing - Programming/Analyst
- Admin - Computing - Web Development
- Admin - Computing – Other
- Admin - Computing – Support and Training
- Admin - Conference and Events Administration
- Admin - Continuing, Distance, & Adult Education
- Admin - Counseling
- Admin - Development and Fund Raising
- Admin - Disability Services
- Admin - Extension and Outreach
- Admin - Facilities Management
- Admin - Faculty Development
- Admin - Financial Aid
- Admin - Food Services
- Admin - Grants Administration & Sponsored Programs
- Admin - Health and Medical Services
- Admin - Human Resources
- Admin - Institutional Research and Planning
- Admin - Instructional and Curriculum Design
- Admin - International Programs
- Admin - Laboratory and Research Technicians
- Admin - Legal Counsel
- Admin - Library Administration
- Admin - Multicultural Services, EEO, and Affirmative Action
- Admin - Museum & Arts Administration
- Admin - Other Administrative Positions
- Admin - Public Relations and Marketing
- Admin - Publications and Editing
- Admin - Registrars
- Admin - Religious Services
- Admin - Residence Life and Housing
- Admin - Secretarial and Support Staff
- Admin - Student Affairs and Services
- Admin - Volunteer Programs

- Executive - Academic Vice Presidents and Provosts
- Executive - Administrative Vice Presidents
- Executive - Deans
- Executive - Presidents and Chancellors

FACULTY CATEGORIES

- Faculty - Agriculture - Agricultural Economics
- Faculty - Agriculture - Animal Science
- Faculty - Agriculture - Entomology
- Faculty - Agriculture - Environmental Science & Ecology
- Faculty - Agriculture - Extension
- Faculty - Agriculture - Food Science
- Faculty - Agriculture - Horticulture & Landscape Architecture
- Faculty - Agriculture - Other
- Faculty - Agriculture - Plant and Soil Science
- Faculty - Agriculture - Veterinary Science
- Faculty - Business - Accounting
- Faculty - Business - Finance
- Faculty - Business - Hotel & Restaurant Management
- Faculty - Business - Information Systems
- Faculty - Business - Management
- Faculty - Business - Marketing
- Faculty - Business - Other Business
- Faculty - Communications - Broadcast Journalism
- Faculty - Communications - Communication & Media Studies
- Faculty - Communications - Communication Disorders
- Faculty - Communications - Film and Video
- Faculty - Communications - Journalism
- Faculty - Communications - Other Communications
- Faculty - Communications - Public Relations and Advertising
- Faculty - Communications - Speech
- Faculty - Education - Adult and Distance Education (study of)
- Faculty - Education - Counselor Education
- Faculty - Education - Curriculum and Supervision
- Faculty - Education - Early Childhood
- Faculty - Education - Edu. Admin & Leadership (study of)
- Faculty - Education - Educational or School Psychology
- Faculty - Education - Elementary
- Faculty - Education - Higher Education (study of)
- Faculty - Education - Instructional Technology & Design
- Faculty - Education - Middle School
- Faculty - Education - Other Faculty in Education
- Faculty - Education - Reading & Developmental Education
- Faculty - Education - Secondary Education
- Faculty - Education - Special Education
- Faculty - Education - Teacher Education
- Faculty - Engineering - Aerospace
- Faculty - Engineering - Agricultural
- Faculty - Engineering - Biological
- Faculty - Engineering - Chemical
- Faculty - Engineering - Civil and Environmental
- Faculty - Engineering - Computer Engineering
- Faculty - Engineering - Electrical
- Faculty - Engineering - Industrial & Manufacturing
- Faculty - Engineering - Mechanical
- Faculty - Engineering - Other Engineering
- Faculty - Fine and Applied Arts - Architecture
- Faculty - Fine and Applied Arts - Art
- Faculty - Fine and Applied Arts - Graphic Design
- Faculty - Fine and Applied Arts - Interior Design
- Faculty - Fine and Applied Arts - Music
- Faculty - Fine and Applied Arts - Other Fine & Applied Arts
- Faculty - Fine and Applied Arts - Theatre and Dance

- Faculty - Health & Medical - Dentistry Faculty
- Faculty - Health & Medical - Medical Researcher
- Faculty - Health & Medical - Nursing Faculty
- Faculty - Health & Medical - Nutrition & Dietetics
- Faculty - Health & Medical - Occupational & Physical Therapy
- Faculty - Health & Medical - Other Health & Medical
- Faculty - Health & Medical - Pharmacy Faculty
- Faculty - Health & Medical - Physical Ed & Kinesiology
- Faculty - Health & Medical - Physician Faculty
- Faculty - Health & Medical - Radiology Faculty
- Faculty - Law Schools
- Faculty - Liberal Arts - American Studies
- Faculty - Liberal Arts - Anthropology
- Faculty - Liberal Arts - Art History
- Faculty - Liberal Arts - Criminal Justice
- Faculty - Liberal Arts - Economics
- Faculty - Liberal Arts - English
- Faculty - Liberal Arts - English as Second Language
- Faculty - Liberal Arts - Ethnic & Multicultural Studies
- Faculty - Liberal Arts - Foreign Languages
- Faculty - Liberal Arts - History
- Faculty - Liberal Arts - Linguistics
- Faculty - Liberal Arts - Other Liberal Arts
- Faculty - Liberal Arts - Philosophy
- Faculty - Liberal Arts - Political Science
- Faculty - Liberal Arts - Psychology
- Faculty - Liberal Arts - Religious Studies & Theology
- Faculty - Liberal Arts - Social Work
- Faculty - Liberal Arts - Sociology
- Faculty - Liberal Arts - Women's Studies
- Faculty - Science - Astronomy and Astrophysics
- Faculty - Science - Biochemistry and Molecular Biology
- Faculty - Science - Biology
- Faculty - Science - Chemistry
- Faculty - Science - Computer Science
- Faculty - Science - Geography
- Faculty - Science - Geology
- Faculty - Science - Library and Information Science
- Faculty - Science - Mathematics
- Faculty - Science - Other Science
- Faculty - Science - Physics
- Faculty - Science - Statistics
- Faculty - Vocational & Technical - Automotive Technology
- Faculty - Vocational & Technical - Aviation
- Faculty - Vocational & Technical - Construction
- Faculty - Vocational & Technical - Culinary Arts
- Faculty - Vocational & Technical - Other
- Faculty - Vocational & Technical - Tourism

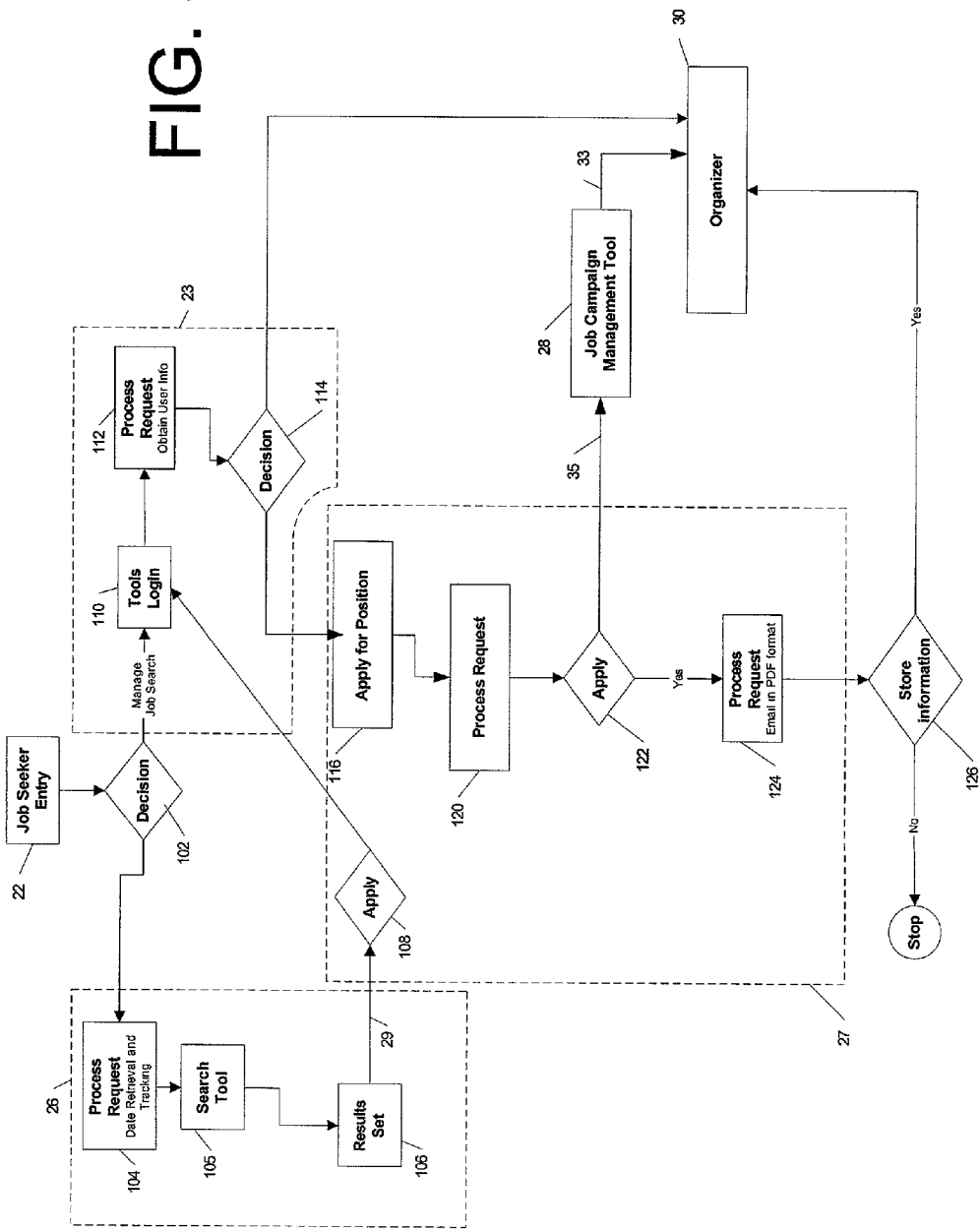

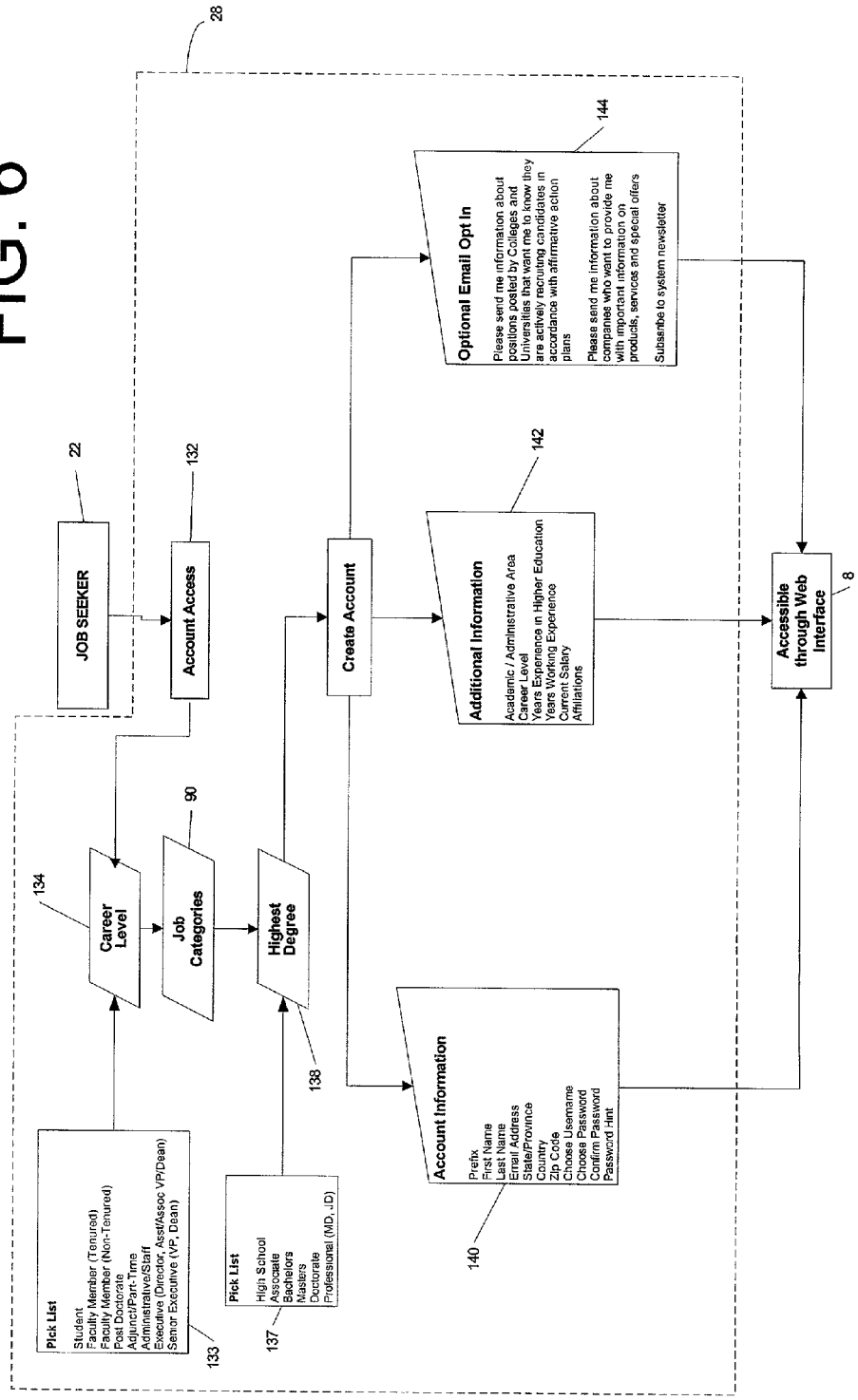

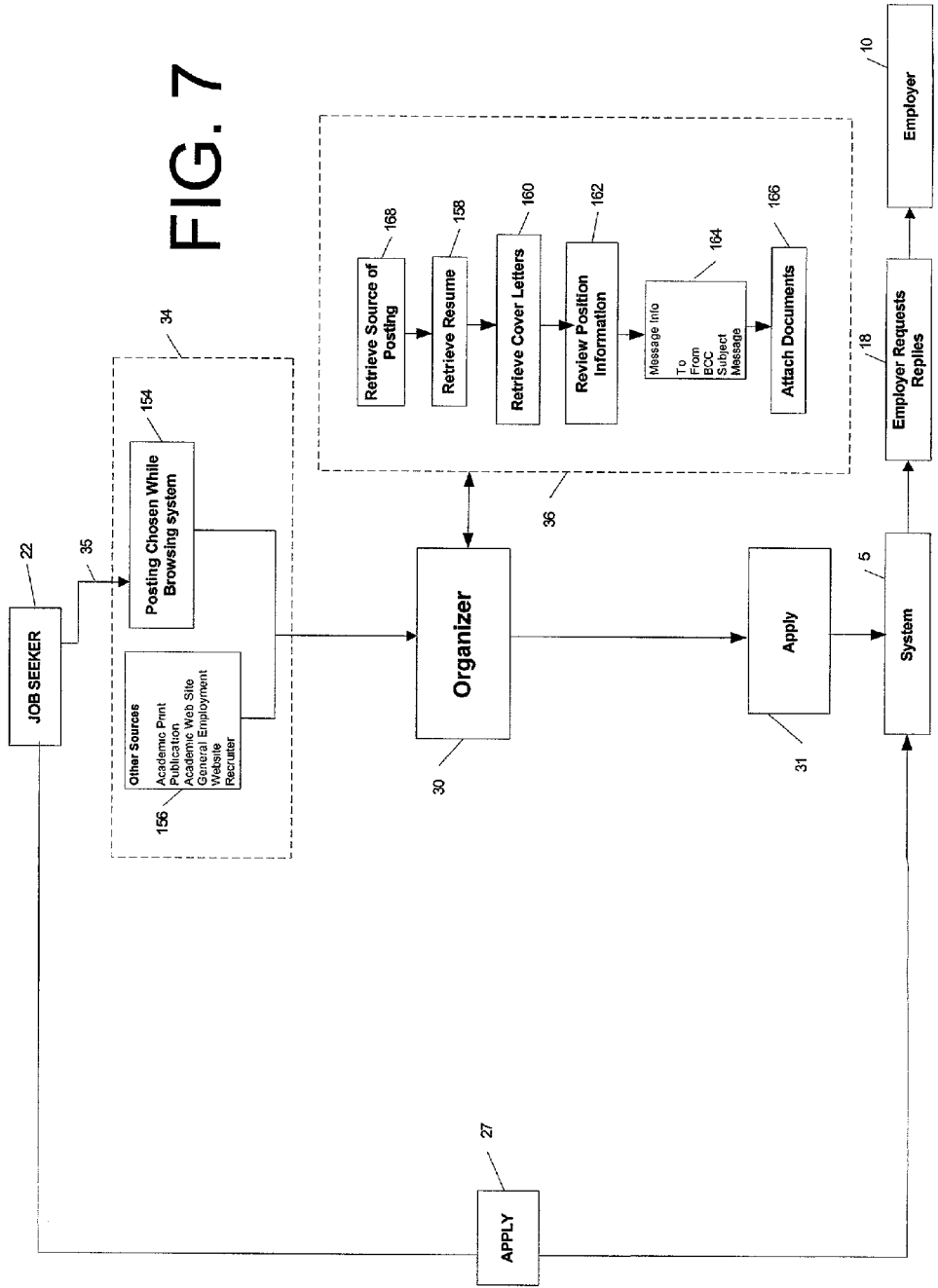

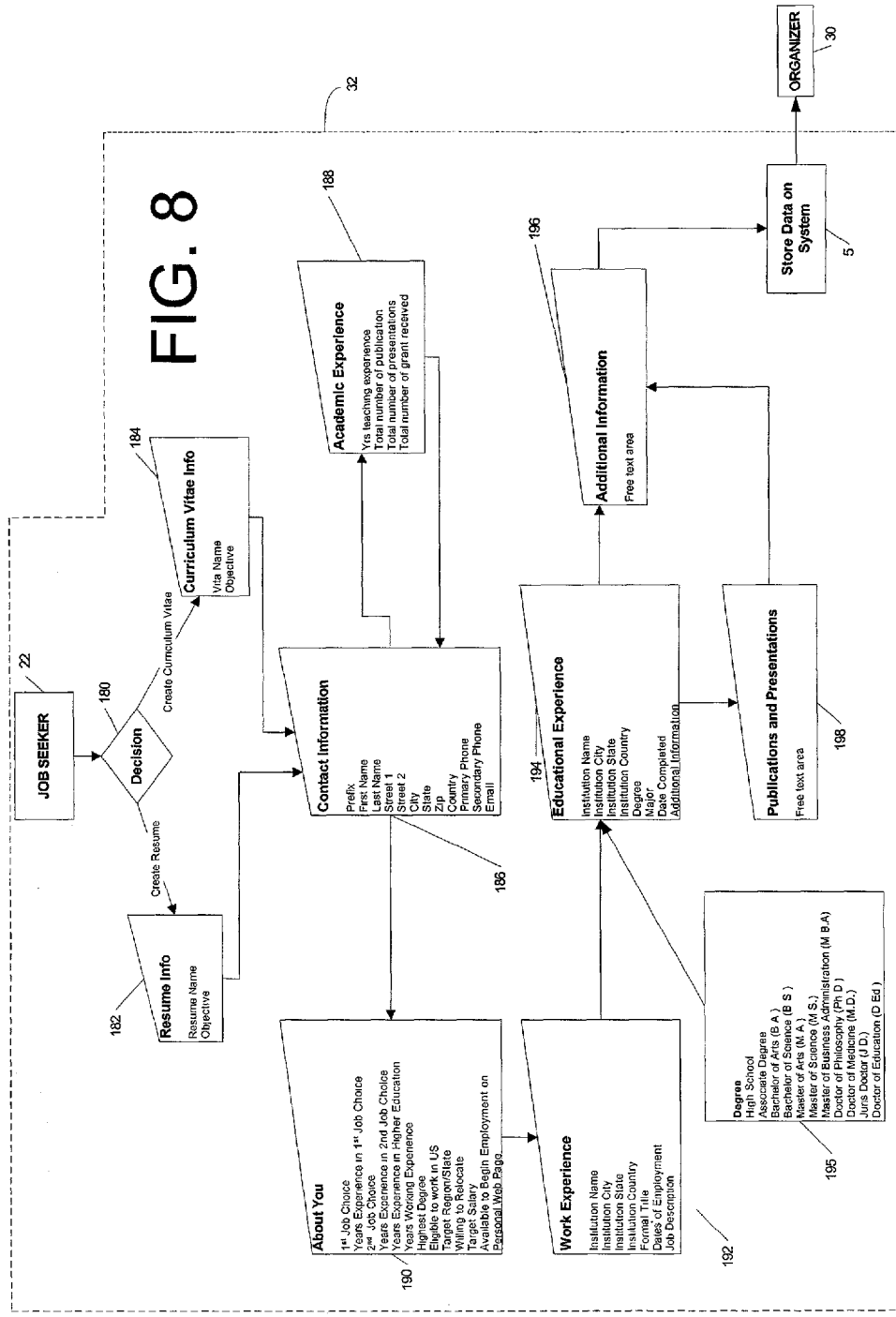

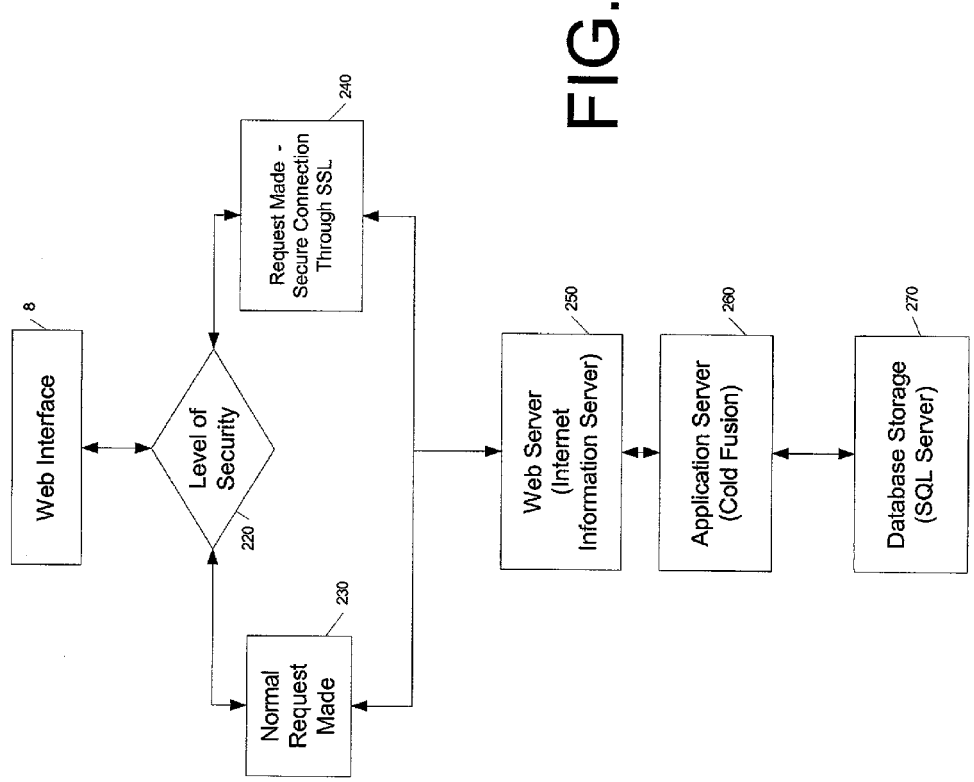

METHOD AND SYSTEM FOR PROVIDING SEARCH ASSISTANCE VIA A COMMUNICATIONS NETWORK

RELATED APPLICATIONS

This application claims priority under 35 USC §119(e) to of U.S. Provisional Application No. 60/281,938, filed Apr. 6, 2001, which is expressly incorporated by reference herein.

BACKGROUND

Employers have traditionally notified jobs seekers of their open positions using classified ads in newspapers, posting services, and by word of mouth. With the advent of the Internet, employers are able to reach a much larger pool of the potential employees instantaneously, and at a lower cost.

In contrast to the traditional means of posting a position, posting over the Internet is fast and inexpensive. It is this low cost to entry that has lead to at least two problems. First, because of the high number of positions posted, a job seeker is overloaded with open positions which in turn makes the likelihood of finding well suited employment less likely. Although categorization of listings and Internet search engine technology solve this problem to an extent, there is a need for a more focused, refined system for finding jobs related to a given employment field.

The second problem created by the low cost to entry is that the job listings themselves are of poor quality. A poor quality listing might be one that is incorrectly formatted, incomplete, or outdated. What is even more likely to cause a listing to fail is mis-categorization, either by the employer himself or by the service the employer uses to make its postings. A poor quality job posting of any of these types may cause a suitable job seeker to miss seeing and responding to what would otherwise be a desirable position. There is therefore a need for a high quality job posting system and method that provides for reviewing the formatting and content of each individual listing.

Universities, colleges, and other higher education institutions have a particular need for a system that provides instantaneous widespread posting of their open positions and that also maintains the highest standards for content and formatting. While such institutions may be able to post positions and receive replies over established Internet job posting sites, using such sites is inefficient because of having to generalize their positions or categorize them into non-educational categories. There is therefore a need for a specialized system with specialized categories for these higher education positions that has built-in efficiencies related to being used specifically for listing open positions in the field of higher education.

SUMMARY

The present disclosure relates to a system and method for providing search assistance to an employer or a job seeker for positions in higher education learning institutions. Information relating to job positions and employer identity is specifically tailored to streamline the posting and application process.

From the employer's perspective, the system and method is as follows. Employers enter to the system and choose whether to post an individual position or subscribe to a service to maintain multiple postings. The employer is able to submit an institutional profile along with one or more links to Internet web sites that a potential job applicant can visit prior to applying for the position. Much of the profile is standard employer contact information, but certain additional information about the employer relevant mainly to learning institutions and higher education is also submitted and made accessible.

Both employer profiles and individual listings are reviewed by the system administrator. This review verifies both content and formatting. The system administrator is experienced in higher education employment. The system administrator's supervision ensures the employer will avoid embarrassing incomplete or poor quality listings.

From a job seeker's perspective, the system and method is as follows. Job seekers may view posted positions at the system administrator's web site. Seekers can enter search criteria into a search engine to produce a list of jobs matching the criteria. Seekers may also browse listed positions by clicking through a series of categories that describe an academic field with increasing specificity or can browse listings by categories relating to a particular location.

The system allows the job seeker to not only view open positions, but also to carry out a higher education job search campaign. Among the tools available to seeker is an online organizer where the job seeker can upload resumes, coversheets, and other relevant documents. Specialized templates with specially tailored fields are used to prepare these documents in an efficient manner to produce an effective presentation of experience and education.

The system also allows the job seeker to docket a series of reminders to remind the job seeker to perform certain actions such as following with up an employer. On the date specified, the system sends an email to the job seeker reminding them to take action. Another aspect of the system is that it allows a job seeker to input certain job related criteria into a "job agent." The system periodically references the job agent and emails to the job seeker a list of positions matching the criteria therein. Management and use of these tools as well as the rest of the site is accessible 24 hours a days, 7 days a week, 365 days a year.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures in which:

FIG. 3 is a diagrammatic overview of the steps carried out by an employer to post a listing onto the system including field labels for the position and fields labels to create a contact information record;

FIG. 4 is a non-exhaustive table of specialized categories in which an employer may list their open positions;

FIG. 5 is a flowchart providing an overview of the job seeker section of the system and the method by which the job seeker interacts with job seeker section;

FIG. 6 is a diagrammatic overview of an integrated job management tool which facilitates building an account for managing the job seeker's campaign and which sends the job seeker periodic emails based on selected criteria entered during account setup and use;

FIG. 7 is a diagrammatic overview of the organizer section of the system which allows the job seeker to create, store, retrieve, and submit employment related documents using an online personalized account;

FIG. 8 is a diagrammatic overview of the information requested from the job seeker to create a resume or curriculum vitae to be stored in the organizer; and FIG. 9 is a diagrammatic overview of the connection between the web interface and the system's underlying software.

DETAILED DESCRIPTION OF THE DRAWINGS

Figure 1:
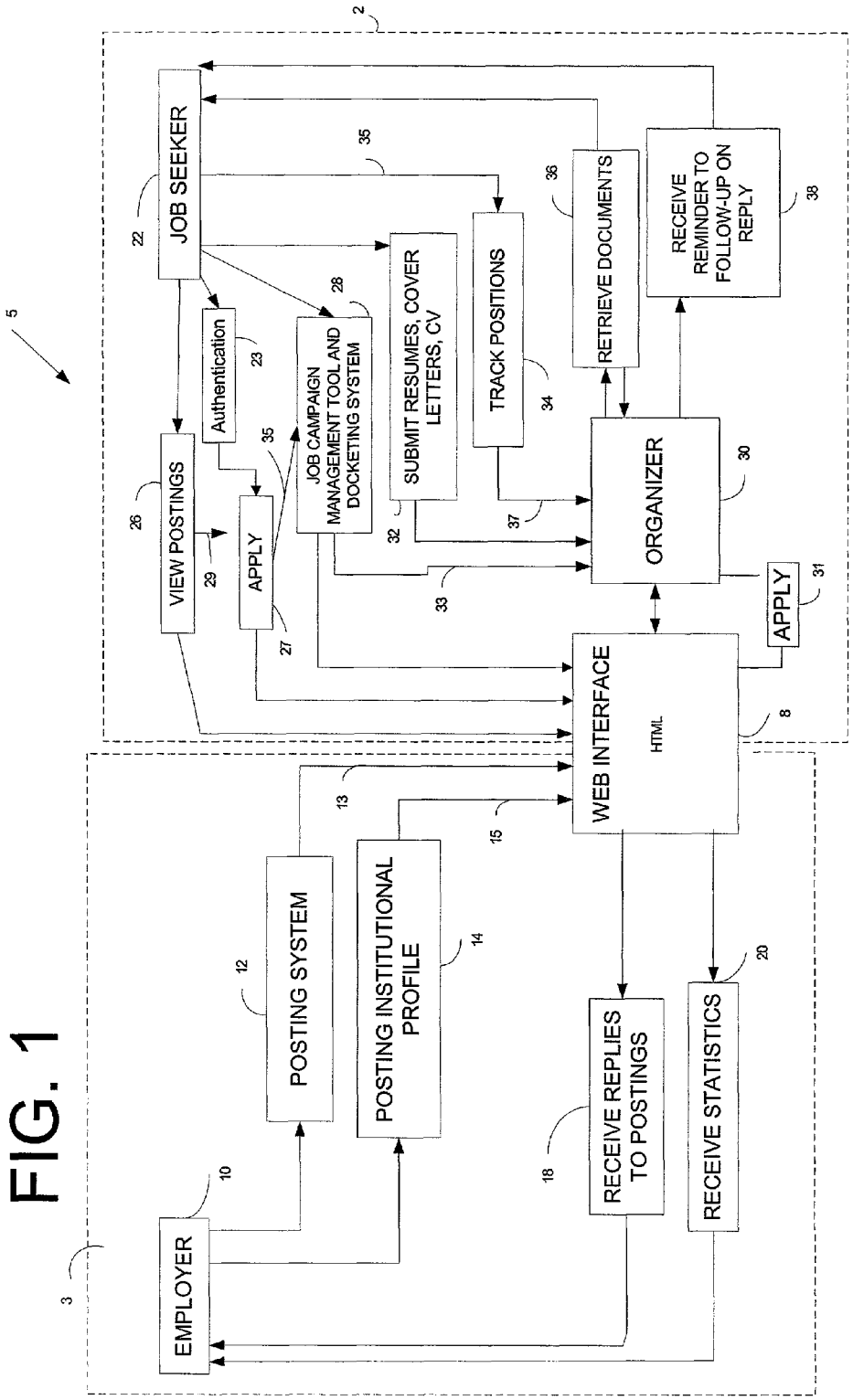
FIG. 1 is a diagrammatic overview of the system and method.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

With reference to the figures, FIG. 1. presents a general overview of the components and functions of a system 5 along with an employer 10 and a job seeker 22 connected to the system 5. The system 5 is configured to interact differently depending on whether the user is an employer 10 or job seeker 22, but both types of users can navigate through the system 5 with ease because it is based on well known web or HTML Internet browser interface 8. For an employer 10, using the system's 5 employer section 3, the system 5 provides the following functionality. An employer 10 is able to post their positions using a posting system 12, such positions being for job opening at learning institutions including, but not limited to, universities and colleges. Employers are also able to submit to the system 5 an institutional profile 14 which will be accessible by job seekers 22 viewing that particular employer's 10 job postings. Employers 10 are also able to receive replies 18 to postings from the system 5 as well as periodically receiving statistics 20 on the frequency and number of job seekers 22 who have browsed their postings.

Continuing in reference to FIG. 1, the system 5 provides the following functionality to a job seeker 22 while using the system's 5 job seeker section 2. A job seeker 22 is able to search and view 26 all the positions 12 submitted to the system 5 by employers 10. Job seekers 22 are also able to apply 27 to the position through the system 5, after they have been authenticated 23, using a job search management tool 28 or job agent. Another feature of the system 5 is the ability to create a job agent 38 in which the job seeker 22 can input criteria about a desired position and direct the system 5 to periodically email to the job seeker 22 a list of posted positions matching those criteria.

Further functionality is provided by an organizer 30 section available to the job seeker 22 which is also a web based interface of known construction and general functionality into which the job seeker 22 can submit resumes, cover letters and curriculum vitae 32 for later retrieval 36. Also, the job seeker 22 can store links to positions 34 in which they have become interested while browsing or searching for postings on the system 5. Job seekers 22 can also use the job campaign management tool 28 which includes a docketing system which allows the job seeker 22 to set reminder or follow-up dates 38 to be generated by the system 5 and sent to the job seeker 12 via email to help the job seeker 22 proactively manage in their employment seeking campaign.

The HTML or web interface 8 allows not only ease of use but also accessibility throughout the U.S. and the world, 24 hours a day, 365 days a year. The system 5 is constantly updated to be current in contrast to printed newsletters or listing which are outdated as soon as they are printed.

Figure 2:
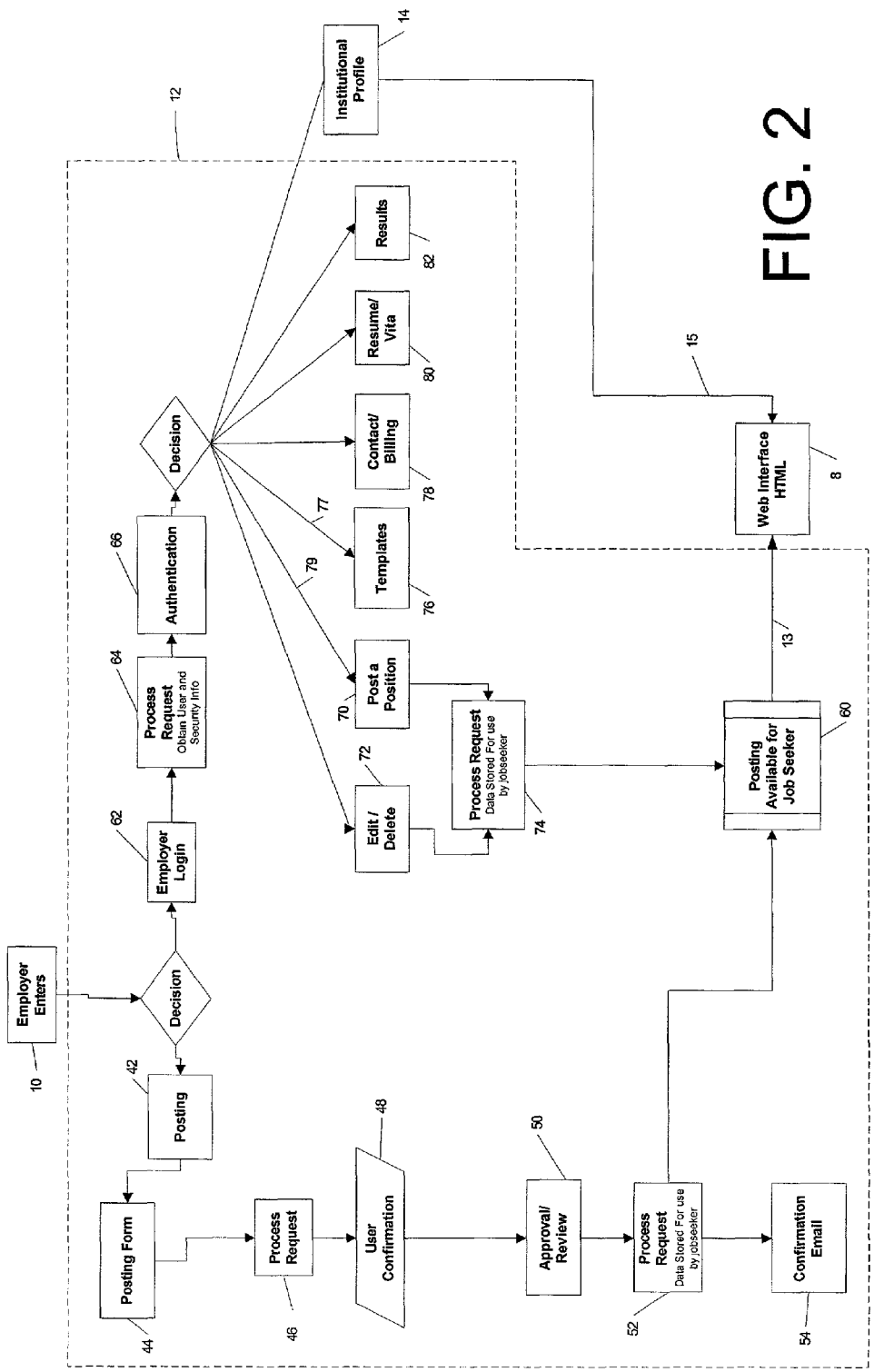
FIG. 2 is a diagrammatic overview of the employer section of the system and the method by which the employer interacts with the employer section system.

Turning to FIG. 2, which is a more detailed diagrammatic overview of the posting system 12, an employer 10 enters the employer section 3 by pointing their Internet Browser to connect to the system 5. An employer 10 has several options on how to make a posting. The first option is to post a single position 42 to the system 5 using a single posting form 44. The fields in the posting form 44 request general information about the position, but also have specialized fields specially tailored to higher education learning institutions.

The specialized fields provide several advantages over general Internet job sites. First, by selecting and including only fields specifically related to higher education, employers 10 are not distracted nor have to waste time entering information into fields that are unimportant or irrelevant to those in the higher education community. Also, the specialized fields act as reminders or may encourage the employer 10 to seek out specific information requested in specialized fields such as the institution's policy in specific areas. For example, the system 5 may have a field for the employer's 10 affirmative action program. This information may be vital to a job seeker's 22 decision on whether or not to apply for the position 12. Another example might be requesting from the employer 10 the minimum level of academic experience required to apply. Such specialized fields, which are absent from general posting systems, act in the disclosed system 5 as cues to the employer 10 to include such information. Such cues improve the overall efficiency of making the posting and ensure their completeness. In addition to filling in the information prompted by the form 44, the employer 10 also selects a primary category and then one or more secondary categories in which to list their posting 12.

Continuing with reference to FIG. 2, after the employer 10 has completed the posting form 44, the employer 10 makes a process request 46 to submit the form 44 into the system 5. The employer 10 is able to review the form 44 and confirm its contents 48 prior to being submitted to the system 5. The posting 42 is now ready for review and approval by the system administrator 50.

The system administrator 50 review process is another advantage over general Internet job web sites. Typically, other job web sites do not review a posting for formatting and accuracy. Such review is not undertaken in part because in order to seek a large employer base, such web sites are organized for large volume non-specialized job postings. By focusing on employers who are higher education institutions, the disclosed system can use specialized content and format specially suited to and used in higher education. A system administrator 50, familiar with the higher education community and employment market, reviews each single posting 42 for possible problems in formatting, content, and completeness. The system administrator 50 also reviews the categories selected by the employer 10 to make sure that the posting 42 will reach the target type of job seeker 22. The list of categories themselves are reviewed periodically by the system administrator 50 to ensure the listings accurately reflect the general classifications in the higher education market.

Upon approval by the system administrator 50, the posting 42 is stored 52 on the system 5 and is available for browsing 60 by job seekers 22. If the system administrator 50 is not satisfied with the posting, the system administrator 50 reports the problem to the employer 10 and works with the employer 10 to revise the posting 42 until the posting 42 is acceptable.

For approved postings 60 the system 5 sends a confirmation email 54 to the employer 10 to provide notification that the position 60 has been posted.

The second option for the employer 10 is to set up an account with the system administrator 50 to make and maintain multiple postings. This relationship may be through a subscription type service for unlimited postings or a discounted cost per post arrangement. Regardless of the type of agreement that allows the employer 10 to make multiple postings, the system 5 provides the following functionality to those employers 10 having multiple postings access.

The system 5 provides access to the employer 10 as follows. An employer 10 enters the system 5 with their employer login 62 via the web site which makes a system request 64 to authenticate 66 the employer 10. Such security avoids unauthorized postings or modifications to preferences on the employer's 10 account. An employer 10 may give certain specified persons in their organization, for example a math department head, selected access to different features provided by the employer section 3. Dividing access in such a manner is referred to in the industry as granular security. Such granular security allows persons specified by the employer 10 to have access to a subset of features, for example a math department head having access to review submitted resumes. Another example might be an administrator having access to the billing/contact settings 78, but not having access to resumes or curriculum vitae 80. By allocating access to the appropriate persons within the organization through such granular security, the person so allocated may efficiently perform their task without being presented with unneeded options. The employer 10, or a person within the organization granted granular access, can also enter an institutional profile 14 or a link to the institution's home page. By storing this information in the employer's 10 account, the information will appear as part of the posting 60, eliminating the need to reenter a separate profile for each posting 60.

The employer 10, or persons within the organization granted granular access, may also navigate the system 5 and choose 79 to post a position 70 in a manner similar to that for posting a single position 42. Other features for which granular access may be provided include the ability to edit or delete a particular posting 72. Modified or newly created postings are processed 74, stored, and made available to job seekers 22. To assist some employers 10 in making their postings 42, employers 10, or persons within the organization granted granular access, may choose 77 to use one or more online templates 76. As with the posting form 44, these templates 76 have been designed and tailored to meet the specialized needs of institution centralized, institution decentralized and hybrid higher education employers 10. Employers 10, or persons within the organization granted granular access, can also update their contact and billing information 78 online. Such access not only reduces the time in communicating with the system administrator 50, but also ensures that submitted resumes, cover letters, and curriculum vitae are routed to the specified party. Access can be easily altered to accommodate institution centralized, institution decentralized, or hybrid employers through use of these multiple posting templates 76. The employer 10, or persons within the organization granted granular access, can also review resumes and curriculum vitae submitted by job seekers 22 into the system's 5 resume/vita section 80 and can view results and statistics 82 regarding how often and how many of their postings 60 have been viewed. The resume/vitae section 80 can be searched by several methods. The employer 10 may search by job category or may choose to conduct a more detailed search based on various criteria including, but not limited to, years experience in the job category and years teaching. The resulting set of resumes and curriculum vitae produced by the search contain each job seeker's 22 credentials for the criteria searched.

FIG. 3 provides a more detailed view of the steps used by an employer 10 with access to make multiple posting to make their posting 12. After being authenticated 66, the employer 10 may choose 79 to post a new position. If authorized, the employer 10 may utilize a posting template 76 to structure the content of their posting 42. The employer 10 next selects job categories 90 in which to post the positions. Employers 10 may also change their posting template 76 to be attached to the posted position before being presented with a posting form 44.

The employer 10 next inputs information about the posted position 42 into the specialized fields 96. The employer 10 also provides contact information about where to send resumes or curriculum vitae 98. The posting 60 is now complete and is stored 74 and made available to job seekers 22 on the system's 5 web interface 8. Postings 60 made by employers 10 with multiple postings access are periodically audited by the system administrator 50 to ensure accuracy, proper formatting, and proper categorization.

Next, FIG. 4 is a table with a non-exhaustive list of the categories 90 into which an employer 10 can post their open positions. This table illustrates that unlike general Internet employment sites, the categories of the current system are specially selected and tailored to employment for faculty or administrators at higher education institutions. The system administrator 50 reviews the categories 90 to ensure that they are useful to employers 10 as well as creating and removing categories 90 in response to changes in market conditions and higher education. The faculty categories are further specialized to mirror the various disciplines of academia with examples including, but not limited to, agriculture, business, communications, education, engineering, fine and applied arts, health and medical, law, liberal arts, science, and vocational and technical. Each of these broad disciplines is further divided into sub-specialties to facilitate a job seeker in that field to make an efficient search. The narrowing of the categories makes the quality and efficiency of the disclosed system 5 an improvement over general Internet employment web sites.

FIG. 5 is a flowchart which provides an overview of the functionality of the system 5 from the perspective of the job seeker 22. A job seeker 22 points his or her Internet browser to the system's 5 web site to enter the system 5. First time job seekers 22 who have not set up accounts on the system 5 to manage their job searching campaign are able to view 26 open positions 60. Returning job seekers 22 may instead decide 102 to immediately use the tools 110 for managing their job seeking campaign. Job seekers 22 not using the tools 110 are able to browse the postings by either clicking through the categories 90 of open positions 60 or by making a process request 104 to the system to use a search tool 105 to search available open positions 60. Job seekers 12 are presented with a results set 106 of open positions 60 matching their search criteria.

At this point the job seeker 22 can choose to apply 108 for the open position by either sending an email to the email address listed in the posting 60 or by setting up an account to use the tools 110 to apply through the system 5. If the job seeker 22 decides to use the tools 110, the job seeker 22 create a new account and select a login and password to create an authentication profile 23. Returning job seekers 22 also login after which the system 5 makes a process request 112 to obtain the stored user's information. Once logged onto the system 5, the tools 110 provide the following functionality.

The job seeker 22 may decide 114 to either apply for the position 60 they visited which prompted them to create an account, or to manage 118 one or more documents stored in their account on the organizer 30.

If the job seeker 22 decides they wish to apply 116 for one or more positions stored in their account at this point, they make a process request 120 to view a list of their stored positions and their stored resumes. The job seeker 22 then decides confirms they wish to apply 122. If the job seeker 22 does confirm 122, their request is sent through the system 5 to the employer 10 specified in the job posting 60 in a format readable 124 by the employer 10. An example of such a format is a Adobe Acrobat .PDF file. The job seeker 22 can choose to store information 126 about how and when the application was transmitted and to subsequently docket a reminder to follow up with the Employer 10 using the job campaign management tools and docketing system 28. Any jobs so stored go into the organizer 30 for later retrieval. Also, the docketing system 28 allows the job seeker 22 to set future dates for specific events such as updating their resume.

FIG. 6 is a diagrammatic chart of the steps and information required to create a job campaign management tool 28 account on the system 5. A job seeker 22 logs into the job campaign management tool 28 to create a new account 132. The job seekers 22 is prompted to enter information about their experience and select the career level in higher education 134 from a pick list 133. The job seeker's 22 career level 134 may range from "student" to "post doctorate experience" for faculty job seekers and "staff" to "senior executive" for administrative position job seekers. The job seeker 22 next selects the category 90 of the position for which they are searching. Next, the job seeker 22 selects the highest degree 138 they have received from a pick list 137.

Account information 140 is then entered by the job seeker 22 including but not limited to their name, address, and account preferences as well as additional information 142 about their areas of experience, current salary, affiliations, and years of experience in higher education. Finally, the job seeker 22 may opt in to receive by email certain information related to higher education or to receive emails about services available from the system 5. Examples include the following: "Please send me information about positions posted by Colleges and Universities that want me to know they are actively recruiting candidates in accordance with affirmative action plans," "Please send me information about companies who want to provide me with important information on products, services and special offers," and "Subscribe to system newsletter." All information stored in the system 5 can be retrieved, edited, or deleted from the system's 5 web interface 8.

Referring now to the next figure, FIG. 7 is a diagrammatic view of the functionality and interaction between the job seeker 22 and the organizer 30 function of the system 5. Generally, the organizer 30 section of the system 5 allows a job seeker 22 to store positions 42 so that he or she may apply for them later. In addition, the job seeker 22 can store one more resumes or cover letters on the system 5 and apply for a given position using the best suited resume and cover letter. Generally a job seeker 22 may apply 27 without using the organizer 30. The organizer 30 allows the job seeker 22 to apply for a position stored earlier or to store a new position in the organizer 30. A new position can be stored while browsing the system's 5 postings 154 or from other sources including but not limited to academic print publications, academic web sites, non-academic web sites, general employment web sites, or information submitted by a recruiter 156. In other words, the job seeker 22 can use the organizer 30 to manage positions found both on 154 and off 156 the system 5.

If the job seeker 22 desires to apply for a position 12 stored in the organizer 30, the process is as follows. The job seeker 22 retrieves the source of the posting. The job seeker 22 next retrieves all stored resumes 158 and all stored cover letters 160. The job seeker 22 then reviews information about the stored position 162. An email-type form 164 is populated with information about the job seeker 22 and with the employer's 10 contact information. The job seeker 22 selects a resume and cover letter attached to the email 166. The completed application 31 is sent through the system 5 to the employer 10 specified in the posting.

FIG. 8 is a diagrammatic view of the information prompted from the job seeker to create the job seeker's online resume 182 or curriculum vitae 184. The job seeker 22 is prompted to decide 180 whether they will present their information in the form of resume 182 or curriculum vitae 184, the choice having significance because the templates differ by type. For either type, a name and objective is provided by the job seeker 22 so that the job seeker 22 can distinguish between different resumes 182 and curriculum vitae 184 stored on the system 5. Next, standard contact information 186 is entered by the job seeker 22. If the job seeker 22 chose to create a curriculum vitae 184, the job seeker 22 will be prompted to also enter curriculum vitae related information such as years of teaching experience, total number of publications, total number of presentations, and total number of grants received 188.

The job seeker 22 next enters information about herself including but not limited to their first job choice, year of experience in their first job choice, year of experience in higher education, years of working experience, highest degree, whether or not they are eligible to work in the United States, target region or state, willingness to relocate, target salary, the date on which they will be available to begin employment, and the domain name of their personal web site 190.

The job seeker 22 is also able to enter unlimited information about work experience 192 and educational experience 194 into the system 5 as well. The job seeker 22 selects their experience level from specialized pick lists of degrees and accreditations 195. There is also a prompt for any additional information 196 into which the job seeker 22 can enter any information they feel relevant including the ability for curriculum vitae 184 creators to list or copy the text of any publication or presentations 198 the job seeker 22 has made. The resume 182 or curriculum vitae 184 is then stored on the system 5 for later modification, retrieval, and transmittal to employers 10. This additional functionality to include publications and presentations 198 would not be found in general Internet employment sites as it would be irrelevant and costly in terms of data storage when only being used for general job posting. However, such materials are a vital consideration to employers 10 in higher education. Therefore, the availability of publication and presentation 198 transmittal provides an efficient and productive method to fill their open employment positions with the best, most-qualified applicants.

Although there are a variety of software packages available to construct the system 5, the following components are provided as the best mode known to the inventor. It is understood that other software packages can be used as to create and manage the system 5. Referring now to FIG. 9, the employer 10 or job seeker 22 makes a request via the web interface 8 to store or retrieve information from the system 5. The connection between the system 5 and the Internet browser of the employer 10 or the job seeker 22 can be made at two levels of security 220. For operations not requiring authentication or authorization, for example viewing open positions 26, a normal request is made to the web server 250. For operations where authentication is required, such as employers 10 submitting their institutional profiles 14, the connection is established through a Secure Socket Link 240 to the web server 250.

There are a variety of software programs suitable for use as the system's web server 250. One such program is Internet Information Server available from Microsoft Corporation. The web server 250 communicates with the application server 260, the code of which provides the look and feel of the web interface 8. As with web server 250, there are a variety of software programs available to build the application server 260. One such program is Cold Fusion available from Macromedia, Inc.

Finally, the application server 260 communicates with a database server 270, in which raw data about employers 10, job seekers 22, open positions 12, and all other data related to the system 5 is stored. One program available for use as a database server 270 is SQL Server available from Microsoft Corporation. The system 5 need not be created by three separate software programs with the described functionality. It is contemplated that one or more programs can provide the functionality of all three servers described above for use as a software backbone of the system 5.

While a preferred embodiment of the disclosure is shown and described, it is envisioned that those skilled in the art may devise various modifications and equivalents without departing from the spirit and scope of the disclosure as recited in the following claims.

What is claimed is:

1. System for posting open positions for a plurality of unrelated employers in higher education and facilitating searching the open positions based on criteria specific to higher education and applying for positions over a communications network, the system comprising:

an employer section wherein a higher education institution submits an institutional profile that is available to a plurality of job seekers and wherein the higher education institution posts at least one open position by entering data into a series of online forms, the forms having one or more fields based on criteria specific to higher education positions;

the employer section also having a means for allowing the higher education institution to input links to one or more web sites providing additional information about the higher education institution;

the system also automatically generating a user statistics report and emailing the user statistics report at least twice a month to a plurality of persons designated by the higher education institution;

a position seeking section, wherein a job seeker builds an electronic resume by inputting data into a plurality of online forms, the forms having one or more fields tailored to higher education experience;

means for docketing a plurality of calendar dates set by the job seeker, wherein the calendar dates are generated automatically when the job seeker applies for an open position, wherein the docketing means automatically notifies the job seeker on the set calendar dates to perform future actions including follow-up which enables the job seeker proactively manage the job seeking campaign;

the position seeking section also having a means for saving and retrieving a plurality of job-related documents tailored to higher education that may be retrieved online by the job seeker, wherein the plurality of job-related documents is comprised of one or more of the following: a resume, a cover letter, an open position listing, and a curriculum vitae, wherein the position seeking section includes a means for attaching one or more of the plurality of job-related documents to an electronic mailing system, wherein open positions based on criteria selected by the job seeker are attached to an email periodically sent to the job seeker.

* * * * *